April 15, 1952     P. H. WAGNER     2,593,228
FILTER

Filed July 12, 1948     3 Sheets-Sheet 1

Inventor
Paul H. Wagner
by Parker & Carter
Attorneys

April 15, 1952 — P. H. WAGNER — 2,593,228
FILTER
Filed July 12, 1948 — 3 Sheets-Sheet 2
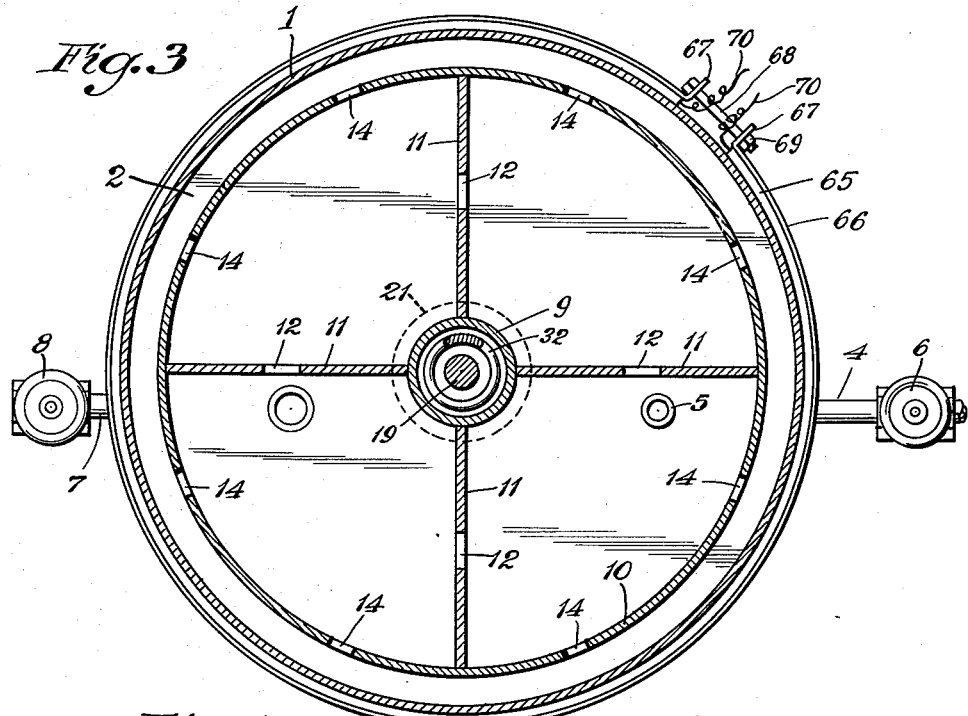
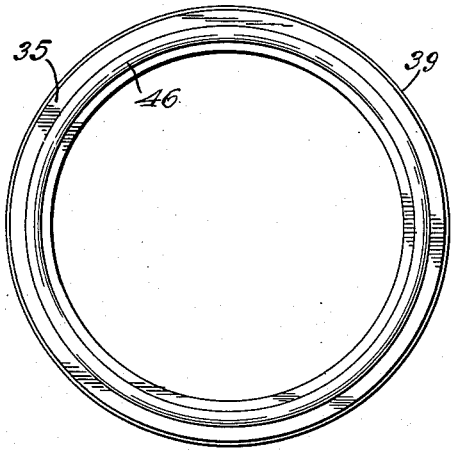
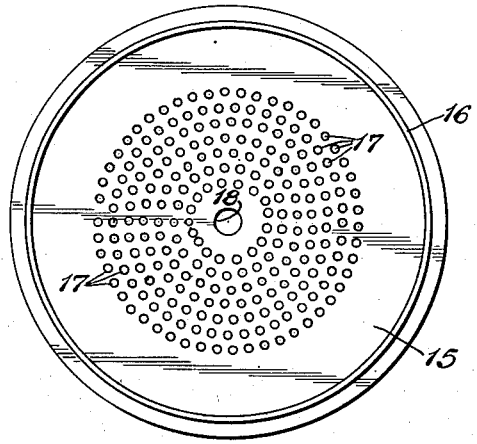
Inventor
Paul H. Wagner
by Parker & Carter
Attorneys April 15, 1952  P. H. WAGNER  2,593,228
FILTER
Filed July 12, 1948  3 Sheets-Sheet 3

Inventor
Paul H. Wagner
by Parker Carter
Attorneys.

UNITED STATES PATENT OFFICE 2,593,228

FILTER

Paul H. Wagner, Milwaukee, Wis.

Application July 12, 1948, Serial No. 38,328

2 Claims. (Cl. 210—134)

My invention relates to an improvement in filters, and has for one purpose to provide an oil filter of maximum efficiency.

Another purpose is to provide an improved filter in which unintended bypassing of the filter members is prevented.

Another purpose is to provide an improved cartridge filter.

Another purpose is to provide improved means for maintaining the filter cartridge under pressure.

Another purpose is to provide an improved filter particularly adaptable for use in situations where extremely efficient filtering of lubricating oil is necessary.

Other purposes will appear from time to time in the course of the specification and claims.

The present application constitutes a continuation-in-part of my application Serial No. 656,345, filed in the United States Patent Office on March 22, 1946, and entitled "Oil Filter."

I illustrate my invention more or less diagrammatically in the accompanying drawings wherein:

Figure 3 is a section on the line 3—3 of Figure 1;

Figure 4 is a plan view of an intermediate sealing ring;

Figure 5 is a plan view of an end or bottom ring against which the filter cartridge may be pressed.

Like parts are indicated by like symbols throughout the specification and drawings.

Figure 1:
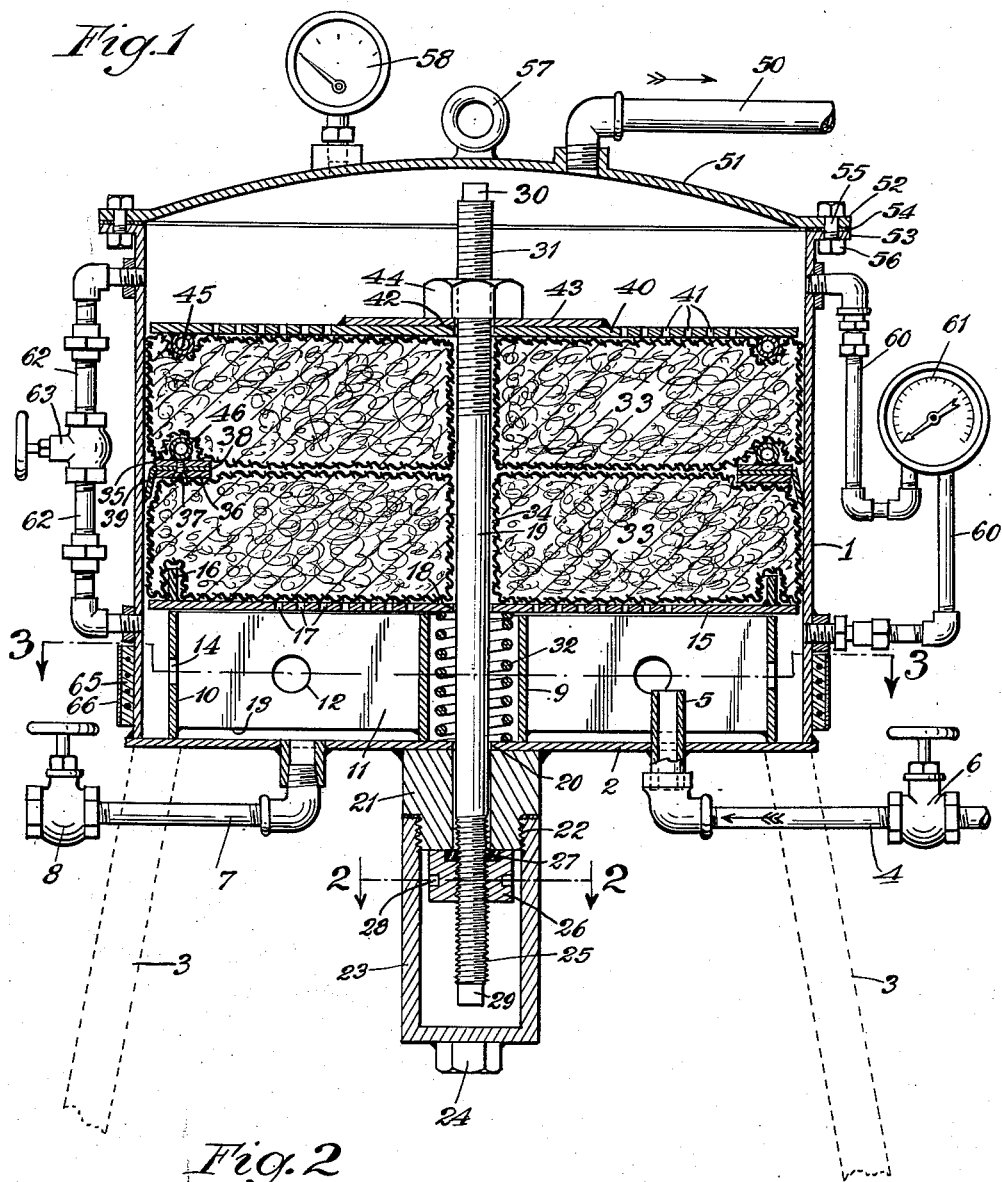
Figure 1 is a vertical axial section.
Figure 2:
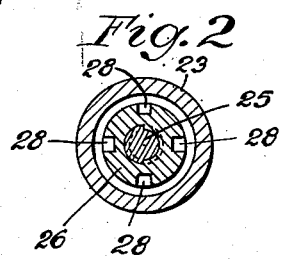
Figure 2 is a section on the line 2—2 of Figure 1.

Referring to the drawings, 1 generally indicates a housing shown as a cylinder or shell of metal. It will be understood that various forms may be employed, but a cylindrical shell is advantageous for strength and for economy of space. 2 indicates a lower head or bottom wall. It may be welded, or otherwise secured, to the shell 1. It may, if desired, be supported on any suitable supporting structure or legs, indicated in dotted line in Figure 1, and generally indicated as 3. An oil inlet pipe 4 has a terminal portion 5 extending upwardly through the bottom wall 2 into what may be described as a sump space, at the bottom of the filter. 6 is any suitable control or closure valve for the oil inlet pipe 4. Material from within the sump area may be withdrawn through a discharge pipe 7, which may be controlled by any suitable valve 8. Within the sump space, and extending upwardly from the bottom plate 2, is a central tubular sleeve 9, which may be connected to a coaxial, circumferential, cylindrical wall 10, by suitable baffles or radius walls 11. The baffles or radius walls 11 are shown as ported or apertured, as at 12, and may have lower edges 13 upwardly spaced from the bottom 2. The circumferential wall 10 may have a plurality of ports 14.

The baffles or radius walls 11 are advantageous in preventing any substantial divergence of the liquid in the sump. They tend to immobilize or prevent currents in the liquid, but do this without cutting off communication between adjacent compartments. They are ported, as at 12, and define bottom passages below the edges 13. The baffled space is in communication with the exterior space through apertures 14.

The sleeve 9 and the wall 10 are shown as of substantially the same height, and are adapted to receive the bottom pressure plate 15 with its circumferential, upwardly extending flange 16 aligned, generally, for convenience, with the wall 10. The plate 15 is provided with a plurality of oil discharge apertures 17. The plate 15 is centrally apertured, as at 18, to permit the passage therethrough of the tension member or rod 19. The lower end of the rod passes downwardly through an aperture 20 in the bottom plate 2 and through the central bore of a fixed member 21, externally screw-threaded at its lower end, as at 22, to receive the outer closure sleeve 23 with its fixed nut 24.

The lower end of the rod 19 is screw-threaded, as at 25, to receive the locking nut 26, with its recessed packing 27. The nut is provided with indentations or apertures 28, adapted to receive a suitable tool, when it is desired to impart relative rotation to the nut 26 and the rod 19. The rod 19 is shown as squared at each end, as at 29 and 30. The upper end of the rod is threaded, as at 31. A coil spring 32, surrounding the rod, is located within the sleeve 9 and is interposed between the bottom plate 2 and the bottom filter pressure plate 15. Any suitable cartridges 33 may be employed, each cartridge having a central aperture 34 through which the rod 19 passes. The cartridges may be advantageously made "tongue-shaped" and I illustrate two superposed cartridges or cartridge layers. The cartridges may be made of any suitable interior packing surrounded by a pervious outer covering of fabric or other suitable material. The two cartridges or cartridge layers are shown as separated by an intermediate cylinder ring, shown as formed of an upper ring 35 and a lower ring 36, the two rings being secured together by suitable securing members 37, with a flexible sealing ring 38 compressed therebetween, and having a circumferential loose lip or flap 39.

The filter cartridges receive an upper pressure plate 40 with its oil-admitting apertures 41. It is centrally apertured, as at 42, to permit the passage of the rod 19. It is provided with a top central pressure plate or washer 43, adapted to receive the nut 44 which is threaded upon the upper thread 31. Confining circumferential ridges or tubes 45, 46 are positioned, respectively, on the lower side of the upper pressure plate 40 and on the upper side of the pressure ring member 35. 50 is any suitable oil supply pipe which is shown as extending directly to the removable cover 51 which is secured by its outer flange 52 to the corresponding outer flange 53 of the shell 1. The two flanges may be secured together, against any suitable packing 54, for example, by the bolts 55 and nuts 56. I illustrate, as secured to the cover or closure 51, an eye 57, whereby the filter unit, as a whole, may be supported or rest. 58 is any suitable thermometer.

A gauge pipe 60 extends between the sump space below the plate 15 and the oil entry space above the plate 40. 61 indicates any suitable gauge. A bypass passage 62 extends between the two same spaces, and is provided with any suitable control valve 63. I may find it advantageous to apply heat to the filter. I illustrate, for example, a circumferentially extending resistance heater 65, which may be held in position, for example, by a surrounding compression ring 66 having outwardly extending flanges 67 connected by a bolt 68, with its nut 69. 70 indicates any suitable actuating circuit. It will be understood, however, that any other suitable heating means may be employed.

Whereas I illustrate a single unit, it will be understood that I may employ a plurality of units which are preferably connected in parallel. I illustrate, for example, in Figure 6, a vertical support 70 extending upwardly from any suitable base 71 and having secured thereon a plurality of abutments 72, located at various levels. Positioned above each abutment is a rotatable hub 73 from which extends any suitable support 74 to the individual filter assemblies, which I indicate as A, B and C. A main oil supply is indicated as at 80, extending to a manifold 81 from which extend branches 82 to each filter. 83 is a discharge manifold connected to the individual filters by receiving ducts, whereby the cleaned oil may be delivered to a unitary oil return duct 85. It will be understood that any suitable valving 86 may be employed whereby one or more of the filters may be removed from service for cleaning or inspection, or for replacement of cartridges, while at least one of the filters is left in operation. A surge load on a single filter is effective to supply at least a minimum supply of oil.

It may also be advantageous to provide more filter units than need normally be used at the same time, so that a stand-in unit will always be available, in cases where any interruption of the supply of filtered oil is dangerous.

Figure 6:
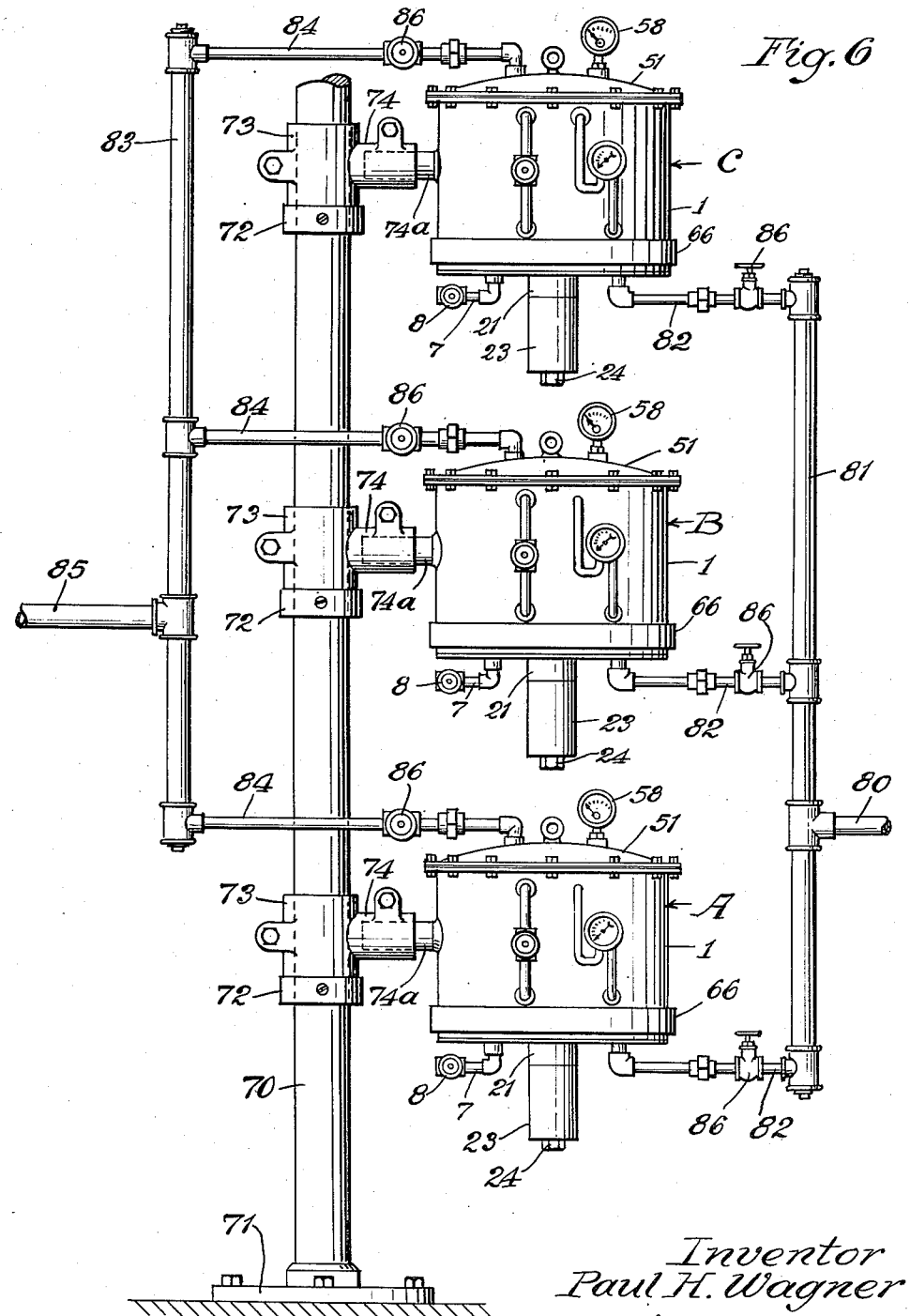
Figure 6 is a more or less diagrammatic illustration of the employment of a plurality of my filters in connection with a single installation.

The support shown in Figure 6 permits individual filters to be swung out of their normal vertical alignment in which position they may readily be removed or opened. I may, for example, connect the individual filters to the members or rods 74 by rotatable connections 74a, whereby, when an individual filter has been rotated out of alignment, by rotation of the sleeve or hub 73, the filter may be rotated about the axis of the members 74 and 74a.

It will be realized that, whereas, I have described and illustrated a practical and operative device, nevertheless many changes may be made in the size, shape, number and disposition of parts without departing from the spirit of my invention. I therefore wish my description and drawings, to be taken as in a broad sense illustrative or diagrammatic, rather than as limiting me to my precise showing.

The use and operation of the invention are as follows:

I illustrate a type of filter and filter support which permits the simultaneous employment of a plurality of filters in a single circuit, and also permits individual filters to be cut out of circuit and replaced by stand-by units. It will be understood, however, that the filter herein described may be used as a single unit, and may, for example, be mounted on any suitable support, as indicated in dotted line at 3 in Figure 1. Since the material is subjected to high pressure, it is important that there be no leakage permitted. The nut 26 is reset to receive the nut gasket 27, which may be of "neoprene" or a suitable rubber substitute. The closure 51 is tightly held against any suitable packing 54.

Within the filter the filter cells or cartridges 33 are firmly sealed or thrust against the inner face of the shell 1 by their subjection to pressure between the plates 15 and 40. The members 16, 45 and 46 are formed and positioned to cause an outward thrust against the inner face of the shell 1 in response to the compression to which the cartridges are subjected. At the same time, the flexible sealing lip 39 is firmly outwardly trust or locked against the inner surface of the shell 1, with the result that a bypassing of oil is substantially impossible. The oil is admitted through the inlet 4 to the sump space. The sump space will normally be filled with dirty oil. The oil is suitably heated by the resistance heater 65, and flows, under pressure, upwardly through the inlet 17, then through the cartridges 33, and, finally, outwardly through the apertures 41 for movement along the cleaned oil discharge pipe 50. The sludge or impurities may be removed along the discharge pipe 7.

The radial members 11 are suitably shortened to terminate along the edges 13, thus maintaining a general communication between the individual portions or segments of the sump space. Oil cannot bypass upwardly about the cartridges because of the outward pinching or thrust of the cartridges caused by the members 45, 46 and 16. At the same time, the sealing lip 39 operates to the same effect.

I claim:

1. A filter structure for liquids including a housing having a circumferential side wall, a bottom wall and a removable top wall, a central rod extending axially through the housing and having end portion extending downwardly through the bottom wall, its upper end lying normally below the removable top wall, a plurality of separable flexible and liquid pervious walled cartridges superposed about said rod, each cartridge having a wall portion defining a central passage through which said rod passes, each cartridge having an interior body of filtering material within and surrounded by the pervious wall, a lower pressure disk surrounding a lower portion of the rod, means for spacing it upwardly above the bottom of the housing, the cartridges being superposed upon each other and resting as a group upon said lower pressure disk, an upper pressure disk positioned upon the upper end of said group of cartridges and being apertured, said rod extending upwardly through said aperture, the lower pressure disk having adjacent, but within its outer edge, a circumferential projection, the upper pressure disk having a downwardly extending circumferential projection adjacent, but within its outer edge, and an additional abutment between adjacent filter cartridges, such abutment including a circumferential projection adjacent, but within the outer edges, of the adjacent filter cartridges, and means for urging the upper and lower pressure disks together along the rod and for thereby subjecting the entire group of cartridges to sufficient pressure to force a concentrated sealing mass of the contents of the cartridges between the said circumferential projections and the opposed inner surface of the circumferential side wall, the pressure disks being apertured means for admitting the liquid to be filtered to the space below the lower pressure disk, and means for withdrawing filtered liquid from the space above the upper pressure disk.

2. The structure of claim 1 characterized by and including a by-pass duct extending, exteriorly of the cartridges, from the space below the lower pressure disk to the space above the upper pressure disk, and controllable means for normally closing said passage.

PAUL H. WAGNER.

REFERENCES CITED

The following references are of record in the file of this patent:

UNITED STATES PATENTS

| Number | Name | Date |
| --- | --- | --- |
| 188,274 | Woolsey | Mar. 13, 1877 |
| 620,621 | Veazie | Mar. 7, 1899 |
| 967,544 | Rarick | Aug. 16, 1910 |
| 989,965 | Harloe | Apr. 18, 1911 |
| 1,077,619 | Maranville | Nov. 4, 1913 |
| 1,367,325 | Probst | Feb. 1, 1921 |
| 1,769,388 | Prentice | July 1, 1930 |
| 1,838,263 | Kelley | Dec. 29, 1931 |
| 1,917,121 | Hughson | July 4, 1933 |
| 2,007,615 | Ross | July 9, 1935 |
| 2,049,498 | Hardinge | Aug. 4, 1936 |
| 2,065,658 | Compton | Dec. 29, 1936 |
| 2,093,549 | Compton | Sept. 21, 1937 |
| 2,287,526 | Krogman | June 23, 1942 |
| 2,300,014 | Saussure | Oct. 27, 1942 |
| 2,353,433 | Auberscheck | July 11, 1944 |
| 2,381,627 | Thompson | Aug. 7, 1945 |
| 2,388,821 | Braun | Nov. 13, 1945 |

FOREIGN PATENTS

| Number | Country | Date |
| --- | --- | --- |
| 117,357 | Germany | Sept. 27, 1898 |
| 641,246 | Germany | Jan. 7, 1937 |